(12) United States Patent  
Harris et al.

(10) Patent No.: US 7,930,576 B2  
(45) Date of Patent: Apr. 19, 2011

(54) SHARING NON-SHARABLE DEVICES BETWEEN AN EMBEDDED CONTROLLER AND A PROCESSOR IN A COMPUTER SYSTEM

(75) Inventors: Ian F. Harris, Kings Park, NY (US); Drew J. Dutton, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 684 days.

(21) Appl. No.: 11/958,601

(22) Filed: Dec. 18, 2007

(65) Prior Publication Data

US 2008/0256374 A1    Oct. 16, 2008

Related U.S. Application Data

(60) Provisional application No. 60/910,863, filed on Apr. 10, 2007.

(51) Int. Cl.  
*G06F 1/26* (2006.01)  
*G06F 15/177* (2006.01)  
(52) U.S. Cl. .............................. 713/324; 713/2; 713/100  
(58) Field of Classification Search .................. 713/324, 713/2, 100  
See application file for complete search history.

(56) References Cited

U.S. PATENT DOCUMENTS

| 5,428,760 | A | * | 6/1995 | Ghori et al. ................... 711/149 |
| 5,634,004 | A | | 5/1997 | Gopinath et al. |
| 5,819,087 | A | * | 10/1998 | Le et al. ............................ 713/2 |
| 5,925,097 | A | | 7/1999 | Gopinath et al. |
| 5,949,997 | A | * | 9/1999 | Smith ................................ 713/2 |
| 6,154,838 | A | * | 11/2000 | Le et al. ............................ 713/2 |
| 6,925,522 | B2 | * | 8/2005 | Pang ............................ 711/103 |
| 7,386,326 | B2 | * | 6/2008 | Sundararajan et al. ....... 455/561 |

* cited by examiner

*Primary Examiner* — Nitin C Patel  
(74) *Attorney, Agent, or Firm* — Meyertons Hood Kivlin Kowert & Goetzel, P.C.; Jeffrey C. Hood; Mark S. Williams

(57) ABSTRACT

System and method for sharing a device, e.g., non-volatile memory, between a host processor and a microcontroller. In response to system state change to a first state wherein the microcontroller is assured safe access to the non-volatile memory (e.g., in response to power-on reset, system reset, sleep state, etc.), the microcontroller holds the system in the first state (e.g., system reset), and switches access to the non-volatile memory from the processor to the microcontroller. While the system is held in the first state, the microcontroller accesses the device (e.g., non-volatile memory), e.g., fetches program instructions/data from the non-volatile memory and loads the program instructions/data into a memory of the microcontroller. After the access, the microcontroller changes or allows change of the system state, e.g., switches access to the device, e.g., the non-volatile memory, from the microcontroller to the processor, and releases the system from the first state.

23 Claims, 5 Drawing Sheets

SHARING NON-SHARABLE DEVICES BETWEEN AN EMBEDDED CONTROLLER AND A PROCESSOR IN A COMPUTER SYSTEM

PRIORITY DATA

This application claims benefit of priority to U.S. Provisional Application Ser. No. 60/910,863, titled "Sharing Non-Sharable Devices Between an Embedded Controller and A Processor in a Computer System", filed on Apr. 10, 2007, whose inventors were Ian Harris and Drew J. Dutton.

BACKGROUND OF THE INVENTION

1. Field of the Invention

This invention relates generally to the field of computing devices, and more specifically to sharing devices, such as non-volatile memory, which are not designed for sharing among processors in a system.

2. Description of the Related Art

Many hardware systems include a central processing unit (CPU), i.e., a main processor, and one or more microcontrollers for performing auxiliary functions for the system, such as initialization, management and reset functionality. Each processor or microcontroller, in a system generally has a corresponding non-volatile memory from which the processor or microcontroller reads instructions for performing boot-up, reset, management (such as power state management), or other functions, implemented in firmware. Current solutions for providing controller memory are: (1) to have a separate dedicated/private memory device for each controller/processor; (2) to integrate memory on-chip; or (3) to attempt to arbitrate for the use of an existing memory device.

However, a problem with attempting to arbitrate for the use of another device is that system performance and user experience may be degraded. Moreover, providing each processor and microcontroller with a separate non-volatile memory is expensive in both cost and time. For example, many current embedded microcontroller solutions for notebook and desktop computers use ROM (read-only memory) solutions that present challenges in time to market and flexibility. The time to market issue is due to the need to finalize the microcontroller firmware and data early enough in the design and manufacturing process to meet the schedule needs for production. This usually represents at least a month in the time schedule of a development program. In addition, any late error found in the firmware or data means that all existing inventory is out of date and may have to be discarded.

For the above reasons, some customers or designers prefer using embedded flash or similar memory for storage, since this type of memory allows updates at production test or even in the field. However, use of embedded flash requires a very expensive manufacturing process, because the microcontroller chip integrates flash memory on the same die, and therefore requires a flash manufacturing process. It is typically 30% more expensive to manufacture a chip with this process, and thus makes the chip significantly more expensive. This expense only makes sense if offset by some other factors, e.g., cost savings or product requirements. If a customer only has one set of firmware (code) that is used and if the code never changes, and if the customer is confident that there are no errors in the code that might require an update, ROM and a standard manufacturing process may be used instead of embedded flash memory. If, on the other hand, the customer has multiple firmware codes (e.g., one per product model), then it may be cheaper to use flash. Thus, due to expense, use of embedded flash memory may only be viable if the risk of ROM is too high or if there are multiple codes, low volume or other specific business reasons.

Thus, as discussed above, current solutions are generally expensive, inflexible, cannot be guaranteed to work reliably, may have occasional errors, and/or can cause significant system performance degradation.

Other corresponding issues related to the prior art will become apparent to one skilled in the art after comparing such prior art with embodiments of the present invention as described herein.

SUMMARY OF THE INVENTION

Various embodiments are presented of a system and method for sharing devices such as non-volatile memory between processors in a computer system where one of the processors has control over operating states, e.g., power and/or execution states, of the other processors in the computer system.

In response to a system state change, such as power on reset or system reset, where a microcontroller in a system is assured of safe access to a shared device, or can prevent the system from entering a state where a processor in the system can access the shared device, the microcontroller may set control signals to cause access to the shared device to be with the microcontroller. In other words, the system may be changed to a state (a "first" state) in which the microcontroller is guaranteed the ability to access the shared device safely, e.g., without interruption or interference by the processor.

In one embodiment, the microcontroller may be situated between a system interface (and therefore, the processor in the system) and the shared device, e.g., non-volatile memory, e.g., embedded flash memory, and thus may intercept communications between the system interface and the device. The device may include or be associated with an interface whereby access to the device is facilitated or implemented, and where this interface may be configured to direct or restrict access to the device to different system components, e.g., the processor or the microcontroller. In one embodiment, the microcontroller setting control signals to cause access to the shared device to be with the microcontroller comprises the microcontroller setting the interface to the shared device interface with the microcontroller. Said another way, the microcontroller may set one or more control signals to configure or redirect the shared device interface to grant exclusive access to the device to the microcontroller.

In one embodiment, the microcontroller controls and manages power on reset (POR) for the system, and thus may respond to and/or generate signals related to power on reset or system reset (or other management signals) in a way that preempts access to the device by the main processor of the system, thereby facilitating sharing a device that otherwise could not be shared. In some embodiments, the change in system state may be invoked or indicated by a management signal, e.g., a system reset or POR signal, generated or received by the microcontroller. It should be noted, however, that in some embodiments, control of the direction of the interface, i.e., control of which component of the system has access to the device, may be independent of the management (e.g., system reset or POR) signal. In other words, the microcontroller may control whether the shared device interface is directed to the processor of the system, or to the microcontroller, independent of the management (e.g., system reset or POR) signal.

While in the first state, i.e., the state where the microcontroller is ensured safe access to the device, or can prohibit access by the processor in the system to the shared device, and has properly configured access to the device, the microcontroller may retrieve or exchange data with the device. For example, in embodiments where the system state is dependent on or indicated by a management signal, e.g., a system reset signal, the microcontroller may receive or generate the management signal, and hold the management signal in this state, i.e., may maintain assertion of the management signal, and, while this signal is asserted, may read, write, acquire, or otherwise exchange (e.g., via invocation of a read or write by some other component of the system), data or program instructions from, to, or with, the device.

Once the controller has completed the data retrieval or exchange with the device or has determined that it may no longer be assured of safe access, the microcontroller may reconfigure the interface through control signals to enable access by the processor in the system, e.g., via a switch that controls access to the device, as will be described below in more detail. Once the microcontroller has configured the device to enable access by the processor in the system, the microcontroller may change or allow change of the system state, thereby permitting the processor in the system to access the shared device. For example, in embodiments where the system state is dependent on or indicated by a management signal, e.g., a system reset signal, the microcontroller may de-assert the management signal, thereby putting the system into a state that allows access to the shared device by the processor of the system.

Thus, using embodiments of the above-described method, the microcontroller may preempt or suspend access to the device by the processor, e.g., the main CPU, of the system, or otherwise configure safe access to the device by the microcontroller; retrieve or otherwise exchange data or program instructions with the device; then return access to the device to the processor, or otherwise relinquish exclusive or safe access to the device by the microcontroller.

It should be noted that in various other embodiments where the microcontroller manages or controls operating states of the system (e.g., reset, POR, sleep, and other states related to specific system activities where it is known by the microcontroller that the system cannot or will not access the device), the microcontroller may monitor (or control) such system states, and take advantage of these states to access the device safely, e.g., to take control and use the shared device. Note that these system states should be such that the microcontroller either manages when the system will exit these states or is provided sufficient warning as to when the system will again need control of the shared interface (to the device). As one example, when a system is being shut down, the microcontroller may take over the device interface, i.e., may redirect the device interface to allow (only) access by the microcontroller, before power-off, i.e., before turning off the final power rail. In this way, writes or other exchanges with the shared device may be "saved up" or queued, and their completion (e.g., by the microcontroller) may be guaranteed before final power off.

Thus, the microcontroller may gracefully share access to the device with the processor of the system. It should be noted that in other embodiments, additional microcontrollers may also share the device with the host or main system CPU, using the techniques described above. In further embodiments, such sharing of devices may also be used in other ways. For example, in some embodiments, a plurality of processors (e.g., microcontrollers) may share such a device, where each processor may in turn suspend or prevent access to the device by the other processors while it accesses the device.

Below are described more specific embodiments of the above-described general method that are particularly directed to the sharing of non-volatile memory between a main processor and a microcontroller in a system. In other words, in the below embodiments, the shared device comprises a non-volatile memory device. It should be noted, however, that these embodiments are meant to be exemplary only, and are not intended to limit the type or use of the shared device to any particular form or function.

In response to a power on reset (POR), a microcontroller in a system, e.g., microcontroller, may hold a system reset signal in a reset state, thereby prohibiting a processor in the system from accessing a non-volatile memory in the system. Note that the POR and/or the system reset may or may not be invoked by the microcontroller.

In other words, in response to the POR, the microcontroller may receive or generate the system reset signal, and hold the signal in a reset state. As described above, in one embodiment, the microcontroller may be situated between the system interface (and therefore, the processor in the system) and the shared device, e.g., non-volatile memory, e.g., embedded flash memory, and thus may intercept communications between the system interface and the device, e.g., the non-volatile memory. As will be described below in more detail, in some embodiments, when the system reset signal is in the reset state, the interface to the non-volatile memory may be configured by the microcontroller to preclude the processor in the system from accessing the non-volatile memory, e.g., via a switch.

While the system reset signal (or other management signal) is held in the reset state, e.g., is asserted by the microcontroller (e.g., and the interface to the non-volatile memory is configured to only allow access by the microcontroller), the microcontroller may fetch program instructions/data from the non-volatile memory and load the program instructions/data into a memory of the microcontroller, or otherwise access the non-volatile memory. In other words, the microcontroller may generate or receive the system reset signal, and may hold the system reset signal in the reset state (e.g., on the system management bus via a system reset line), i.e., may maintain assertion of the system reset signal, and, while the system reset signal is asserted, may fetch, i.e., read, acquire, or otherwise receive (e.g., via invocation of a read by some other component of the system), program instructions/data from the non-volatile memory and load or write the program instructions/data into the microcontroller's memory. Note that the microcontroller's memory is preferably RAM (random access memory), although any type of re-writeable memory may be used as desired. As noted above, in some embodiments, the program instructions/data may include program firmware code, that may, for example, be usable by the embedded microcontroller for startup or reset functionality, e.g., for initializing the microcontroller, among other uses. In some embodiments, the microcontroller may be or include a peripheral device controller for a computer system. For example, in one exemplary embodiment, the embedded microcontroller may be a keyboard controller, and the non-volatile memory device 108 may store keyboard controller (KBC) code, although in other embodiments, any other program instructions/code or data may be used as desired.

In one embodiment, the microcontroller may include or couple to a host memory bus, which may couple to the system interface, and may also include or couple to a device bus, in this embodiment, a non-volatile memory bus, which may couple to the shared non-volatile memory device. In one embodiment, the host memory bus and the non-volatile memory bus are SPI (serial peripheral interface) buses, although other protocols may be used as desired. Note that in some embodiments, the host memory bus and the non-volatile memory bus may be considered the same bus, e.g., a memory bus, where the microcontroller is inserted to switchably intercept and possibly redirect signals signals on the bus(es).

In one embodiment, the microcontroller includes or is coupled to a switch controlled by a switch control, for providing switching functionality for the host memory bus and the non-volatile memory bus, e.g., for the memory bus. The microcontroller may thus be operable to switchably preempt and inhibit signal flow on the memory bus (i.e., the host memory bus and the non-volatile memory bus) between the host interface and the non-volatile memory, e.g., by placing the switches into a high-impedance state, and to fetch instructions/data from the non-volatile memory while communication between the host interface and the non-volatile memory is suspended. Thus, the microcontroller may operate to configure the interface to the device (e.g., the switch) to regulate and enforce safe access to the device.

After the microcontroller has loaded the program instructions/data from the non-volatile memory, the microcontroller may reconfigure the access to the non-volatile memory, e.g., via the switch, and release the system reset signal from the reset state, thereby permitting the processor in the system access to the non-volatile memory. In other words, upon completion of the fetch of instructions/data from the non-volatile memory by the microcontroller, the microcontroller may terminate the suspension or preemption of communications between host interface and the non-volatile memory, thereby allowing resumption of such communications, e.g., via switch, and de-assert the system reset signal.

Thus, using embodiments of the above-described method, the microcontroller may preempt or suspend communications with the non-volatile memory by the main CPU and read instructions/data from the non-volatile memory, e.g., to initialize the microcontroller and/or perform other functionality prior to, or independent from, operation of the main system, i.e., the main CPU, thus sharing the non-volatile memory with the main system. For example, in some embodiments, the microcontroller may, in addition to initialization code/data, may also fetch program instructions and/or data related to pre-boot security operations, and may operate to perform such pre-boot security operations prior to boot-up of the main system, thereby providing additional security to the system.

Thus, the microcontroller may gracefully share use of the main system's non-volatile memory. It should be noted that in other embodiments, additional microcontrollers may also share this non-volatile memory with the host or main system CPU, using the techniques described above. In further embodiments, such sharing of non-volatile memory may also be used in other ways. For example, in some embodiments, a plurality of microcontrollers may share a non-volatile memory (e.g., that is not used by the main system CPU), where each microcontroller may in turn suspend or prevent access to the non-volatile memory by the other microcontrollers while it loads instructions/data from the memory.

Note that in various embodiments, the system changing to a state where the microcontroller is assured safe access to the non-volatile memory (or device) may be performed or mediated by software or hardware. In other words, in some embodiments, the state change may be in response to hardware signals, such as POR signals, etc. In other embodiments, the state change may be in response to software events, tokens, software conditions, software messages, software handshakes, and so forth. Said another way, embodiments of the present invention are intended to cover virtually any case where the embedded controller can determine that it can safely take control of the shared non-volatile memory, whether the "safe" system state is mediated or signaled via software or hardware. For example, the system may pass the microcontroller a token, which grants the microcontroller ownership of the memory through a software handshake.

Thus, various embodiments of the invention described herein may allow an embedded microcontroller and a processor in a system to share a device that is not designed to be shared.

BRIEF DESCRIPTION OF THE DRAWINGS

The foregoing, as well as other objects, features, and advantages of this invention may be more completely understood by reference to the following detailed description when read together with the accompanying drawings in which.

Figure 1A:
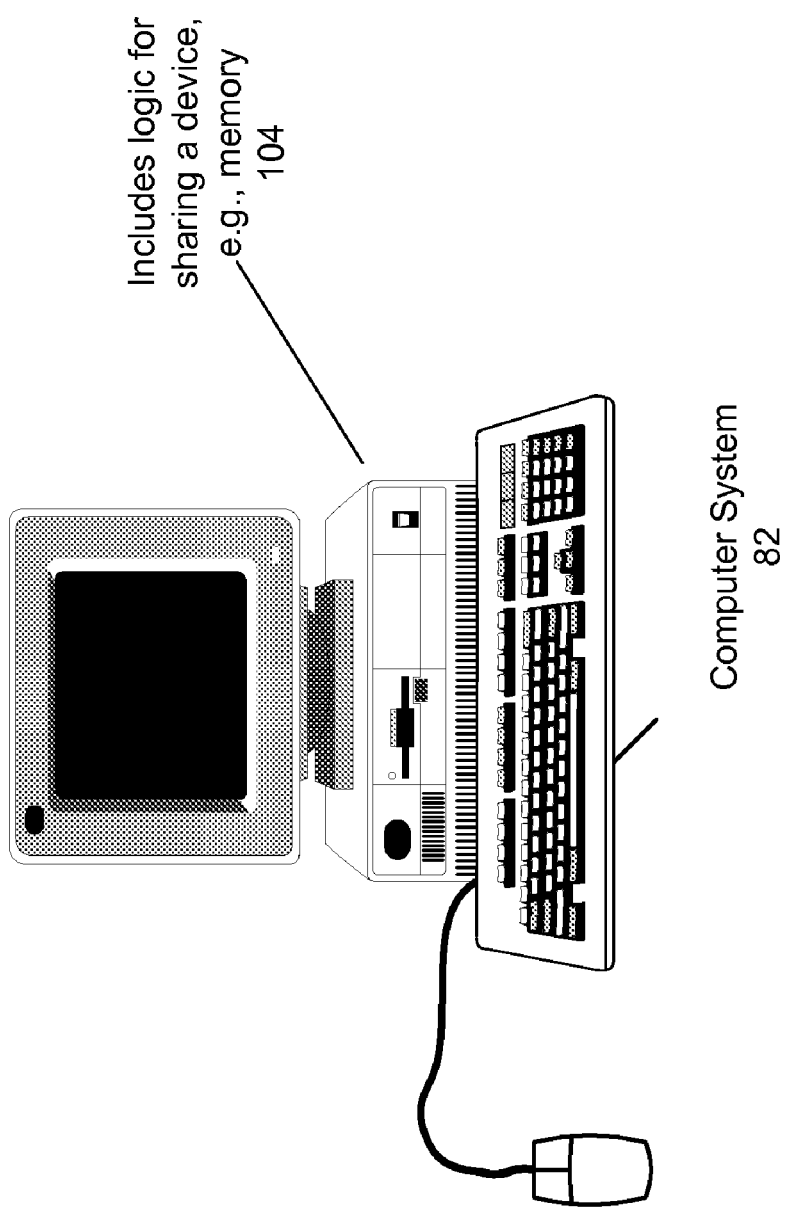
FIG. 1A illustrates an exemplary computer system configured to implement one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE EMBODIMENTS

Incorporation by Reference

The following references are hereby incorporated by reference in their entirety as though fully and completely set forth herein:

U.S. Provisional Application Ser. No. 60/910,863, titled "Sharing Non-Sharable Devices Between an Embedded Controller and A Processor in a Computer System", filed on Apr. 10, 2007, whose inventors were Ian Harris and Drew J. Dutton.

Various embodiments of a system and method are presented for sharing devices between processors, e.g., between a one or more main processors and a microcontroller, in a system, e.g., a computer system, where the microcontroller has control over the power or execution states of the main processor(s) or other unique management capabilities relative to the other processors in the system.

Note that any headings used are for organizational purposes only and are not meant to be used to limit or interpret the description or claims. Furthermore, it should be noted that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

Moreover, as used herein, a "set of instructions" may refer to one or more instructions. More specifically, in some embodiments, "instructions" may refer to programming code, software, and/or functions implemented in the form of a code that is executable by a controller, microprocessor, and/or custom logic circuit adapted to execute these instructions. In some embodiments, these instructions may comprise device drivers, control software, and/or machine code.

As used herein, a "controller" refers to any type of processor, such as a central processing unit (CPU), microprocessor, microcontroller, or embedded controller or microcontroller, among others.

Overview

Various embodiments of the invention described herein may provide access by an embedded microcontroller to a device (e.g., non-volatile memory) which allows the microcontroller to access and read or write program instructions/data (meaning program instructions and/or data) from or to the device while holding the system, e.g., the CPU, in a state such as reset where access to the non-volatile memory device will not disrupt the normal system function.

FIG. 1A—Exemplary Computer System

FIG. 1 is a high-level block diagram of an exemplary computer system 82 configured to implement some embodiments of the present invention. The system of FIG. 1 comprises a computer system, e.g., a personal computer (PC), although in other embodiments, the techniques and systems described herein may be implemented in any other systems as desired.

Figure 1B:
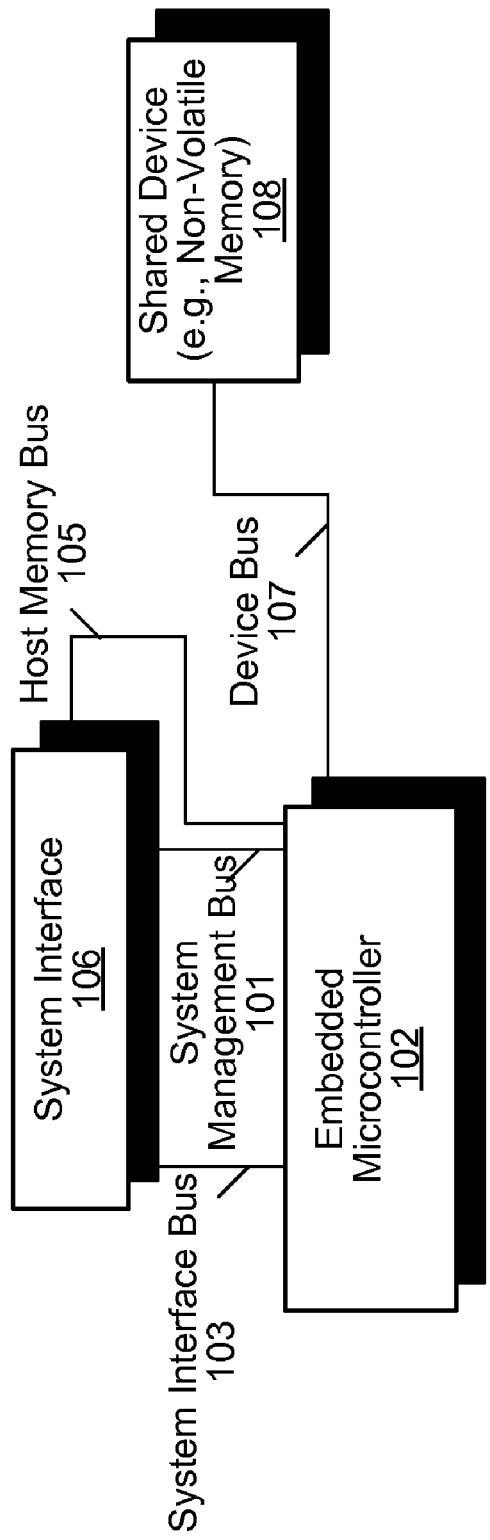
FIG. 1B is a high-level block diagram of an exemplary system configured to implement one embodiment of the present invention.

In preferred embodiments, the computer system 82 includes a main or central processor, i.e., a host processor, as well as one or more microcontrollers, e.g., each in a respective system-on-chip (SoC), such as, for example, a keyboard controller for managing or controlling communications between a keyboard and the main processor. The memory is preferably included on the SoC with the embedded controller, and in various embodiments, may be a non-volatile memory, e.g., ROM (read only memory), or a volatile memory, such as Flash memory, as desired. As FIG. 1 shows, the computer system 82 includes logic 104 for sharing memory, e.g., between the main processor and the microcontroller, according to embodiments of the present invention. Further details regarding exemplary embodiments of the system are provided below with reference to FIGS. 1B, 2, 4, and 6.

FIG. 1B—Exemplary System

FIG. 1B is a high-level block diagram of an exemplary system configured to implement one embodiment of the present invention, specifically to share a device, e.g., non-volatile memory, between a CPU or main processor, and an embedded microcontroller in the system. The system of FIG. 1B preferably resides in a computer system, e.g., a personal computer (PC) such as computer system 82 of FIG. 1A, although in other embodiments, the techniques and systems described herein may be implemented in any other systems as desired.

As FIG. 1B shows, the system may include an embedded microcontroller 102, coupled to system interface 106 via a system interface bus 103, whereby the microcontroller 102 may communicate with the CPU of the computer system, referred to as the host CPU or processor. Note that in various embodiments, this system interface 106 may simply be a connection or bus suitable for communications between the microcontroller 102 and the host CPU, or may include additional structure or functionality as desired. As indicated in FIG. 1B, the microcontroller 102 may be further coupled to a shared device 108 that may store program instructions or other data that may be uploaded or programmed by the embedded microcontroller, e.g., for startup, general, or reset functionality, via a device bus 107, as shown. The microcontroller 102 may be further coupled to the system interface 106 via a host memory bus 105, whereby the embedded microcontroller 102 may intercept memory requests or other signals transmitted between the system interface (e.g., the host CPU) and the shared device 108. Note that the program instructions/data stored in the shared device (e.g., non-volatile memory) 108 preferably includes program instructions, e.g., firmware code, that may, for example, be usable by the embedded microcontroller 102 for startup, general, or reset functionality, e.g., for initializing the microcontroller 102, among other uses. In some embodiments, the microcontroller 102 may comprise a peripheral device controller for a computer system. For example, in one exemplary embodiment, the embedded microcontroller 102 is a keyboard controller, and the shared device 108 may store keyboard controller (KBC) code, although in other embodiments, any other program instructions, data or code may be used as desired.

Thus, in the embodiment shown in FIG. 1B, the embedded microcontroller 102 is situated between the system interface 106 and the shared device (e.g., non-volatile memory) 108, and so may function as an intermediary or intercept between these two components, thereby facilitating sharing the device 108 between the host processor and the embedded microcontroller 102, as will be described below in more detail. Note that in this embodiment, a system management bus, e.g., a system reset bus, 101 coupling the system interface 106 and the microcontroller 102 may be included for communicating a reset or other management signal (or other signal) between the two components, although in other embodiments, the system interface bus 103 may be used. In preferred embodiments, the shared device 108 is an embedded flash memory, although other types of devices may be used as desired, e.g., ROM or any other type of memory.

Figure 2:
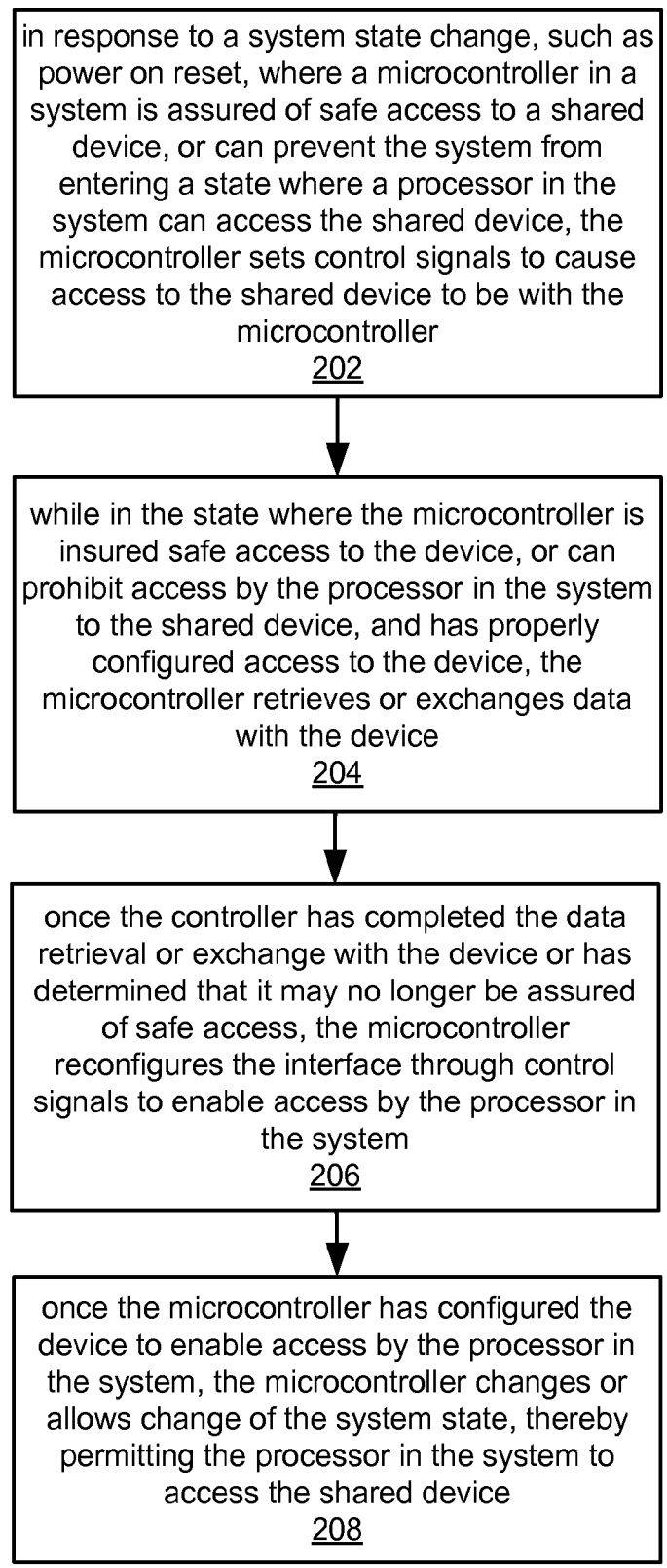
FIG. 2 is a flowchart of a method for sharing a device between a processor and a microcontroller in a system, according to one embodiment.

FIG. 2—Method for Sharing a Device Between Processors in a System

FIG. 2 is a high-level flowchart of embodiments of a method for sharing a device, e.g., non-volatile memory, between processors, e.g., between a processor and a microcontroller in a system, e.g., a computer system, where the shared device is not designed to be shared. In various embodiments, some of the method elements shown may be performed concurrently, in a different order than shown, or may be omitted. Additional method elements may also be performed as desired. As shown, this method may operate as follows.

In 202, in response to a system state change, such as, for example, power on reset (POR), system reset, or sleep mode, where a microcontroller, e.g., microcontroller 102, in a system is assured of safe access to a shared device, or can prevent the system from entering a state where a processor in the system can access the shared device, the microcontroller may set control signals or utilize software to cause access to the shared device to be with the microcontroller. In other words, when the system is changed to a state, e.g., a first state, in which the microcontroller 102 is guaranteed the ability to access the shared device safely, e.g., without interruption or interference by the processor, the microcontroller may hold the system in the state and switch access to the shared device, e.g., the non-volatile memory, from the processor to the microcontroller. Examples of this first state may include one or more of: a power on reset (POR) state, a system reset state, or a sleep state, among others. Holding the system in this first state may prohibit the processor in the system from accessing the shared device, e.g., non-volatile memory in the system.

Similarly, the state change may be invoked or caused by a management signal, such as a POR, system reset, sleep, signal, etc., which may include a software signal, event, token, handshake, etc. In one embodiment, holding the system in the first state may include holding a management signal in a corresponding state, e.g., holding a system reset signal in a reset state.

Note that the management signal, e.g., the POR and/or the system reset, and/or any other type of management signal used, may or may not be invoked by the microcontroller. Thus, for example, in response to a received management signal, e.g., POR signal, or in response to generating the management signal, e.g., the POR signal, the microcontroller may generate or receive another management signal, e.g., the system reset signal, then hold or assert the other management signal in a specified state, e.g., a reset state.

As noted above with reference to FIG. 1B, in one embodiment, the microcontroller 102 may be situated between the system interface 106 (and therefore, the processor in the system) and the shared device 108, e.g., non-volatile memory, e.g., embedded flash memory, and thus may intercept communications between the system interface and the device 108.

The device 108 may include or be associated with an interface whereby access to the device is facilitated or implemented, and where this interface may be configured to direct or restrict access to the device to different system components, e.g., the processor or the microcontroller. In one embodiment, the microcontroller setting control signals to cause access to the shared device to be with the microcontroller comprises the microcontroller setting the interface to the shared device interface with the microcontroller. Said another way, the microcontroller may set one or more control signals to configure or redirect the shared device interface to grant exclusive access to the device to the microcontroller. In other embodiments, the switching of access to the shared device from the processor to the microcontroller may be performed via software, or a combination of software and hardware. Note that as used herein, the term "signal" may denote a hardware signal and/or a software signal, e.g., a software event, message, token, handshake, etc. Thus, the term "management signal" may refer to a hardware signal or a software signal.

Note that in a preferred embodiment, the microcontroller controls and manages power on reset (POR) for the system, and thus may respond to and/or generate signals or software events or messages related to power on reset or system reset (or other management signals) in a way that preempts access to the device by the main processor of the system, thereby facilitating sharing a device that otherwise could not be shared. In some embodiments, the change in system state may be invoked or indicated by a management signal, e.g., a system reset or POR signal, generated or received by the microcontroller. It should be noted, however, that in some embodiments, control of the direction of the interface, i.e., control of which component of the system has access to the device, may be independent of the management (e.g., system reset or POR) signal. In other words, the microcontroller may control whether the shared device interface is directed to the processor of the system, or to the microcontroller, independent of the management (e.g., system reset or POR) signal. Moreover, in some embodiments, instead of, or in addition to, hardware signals, the microcontroller may respond to software events, messages, tokens, handshakes, etc., that may indicate when the system state is such that the microcontroller is assured safe access to the shared device, e.g., to non-volatile memory.

In 204, while the system is in the first state, i.e., the state where the microcontroller is insured safe access to the device, or can prohibit access by the processor in the system to the shared device, and has properly configured access to the device, the microcontroller may retrieve or exchange data with the device 108. For example, in embodiments where the system state is dependent on or indicated by a management signal, e.g., a system reset signal, the microcontroller may generate or receive the management signal, and hold the management signal in this state, i.e., may maintain assertion of the management signal, and, while this signal is asserted, may read, write, acquire, or otherwise exchange (e.g., via invocation of a read or write by some other component of the system), data or program instructions from, to, or with, the device. In one embodiment, while the system is held in the first state, the microcontroller may fetch program instructions/data from the non-volatile memory and load the program instructions/data into a memory of the microcontroller.

In 206, once the controller has completed the data retrieval or exchange with the device or has determined that it may no longer be assured of safe access, the microcontroller may reconfigure the interface through control signals to enable access by the processor in the system, e.g., via a switch that controls access to the device, as will be described below in more detail.

In 208, once the microcontroller has configured the device to enable access by the processor in the system, the microcontroller may change or allow change of the system state, thereby permitting the processor in the system to access the shared device. For example, in embodiments where the system state is dependent on or indicated by a management signal, e.g., a system reset signal, the microcontroller may de-assert the management signal, thereby putting the system into a state that allows access to the shared device by the processor of the system. Said another way, after the program instructions/data have been loaded, the microcontroller may switch access to the shared device, e.g., the non-volatile memory, from the microcontroller to the processor, and release the system from the first state.

Thus, using embodiments of the above-described method, the microcontroller 102 may preempt or suspend access to the device by the processor, e.g., the main CPU, of the system, or otherwise configure safe access to the device by the microcontroller; retrieve or otherwise exchange data or program instructions with the device; then return access to the device to the processor, or otherwise relinquish exclusive or safe access to the device by the microcontroller.

It should be noted that in various other embodiments where the microcontroller manages or controls operating states of the system (e.g., reset, POR, sleep, and other states related to specific system activities where it is known by the microcontroller that the system cannot or will not access the device), the microcontroller may monitor (or control) such system states, and take advantage of these states to access the device safely, e.g., to take control and use the shared device. Note that these system states should be such that the microcontroller either manages when the system will exit these states or is provided sufficient warning as to when the system will again need control of the shared interface (to the device).

As one example, when a system is being shut down, the microcontroller may take over the device interface, i.e., may redirect the device interface to allow (only) access by the microcontroller, before power-off, i.e., before turning off the final power rail. In this way, writes or other exchanges with the shared device may be "saved up" or queued, and their completion (e.g., by the microcontroller) may be guaranteed before final power off.

Thus, the microcontroller 102 may gracefully share access to the device 108 with the processor of the system. It should be noted that in other embodiments, additional microcontrollers may also share the device with the host or main system CPU, using the techniques described above. In further embodiments, such sharing of devices may also be used in other ways. For example, in some embodiments, a plurality of processors (e.g., microcontrollers) may share such a device, where each processor may in turn suspend or prevent access to the device by the other processors while it accesses the device.

Other Embodiments

Below are described more specific embodiments of the above-described general method of FIG. 2 that are particularly directed to the sharing of non-volatile memory between a main processor and a microcontroller in a system. In other words, in the below embodiments, the shared device comprises a non-volatile memory device. It should be noted, however, that the embodiments of FIG. 3 are meant to be exemplary only, and are not intended to limit the type or use of the shared device to any particular form or function.

Figure 3:
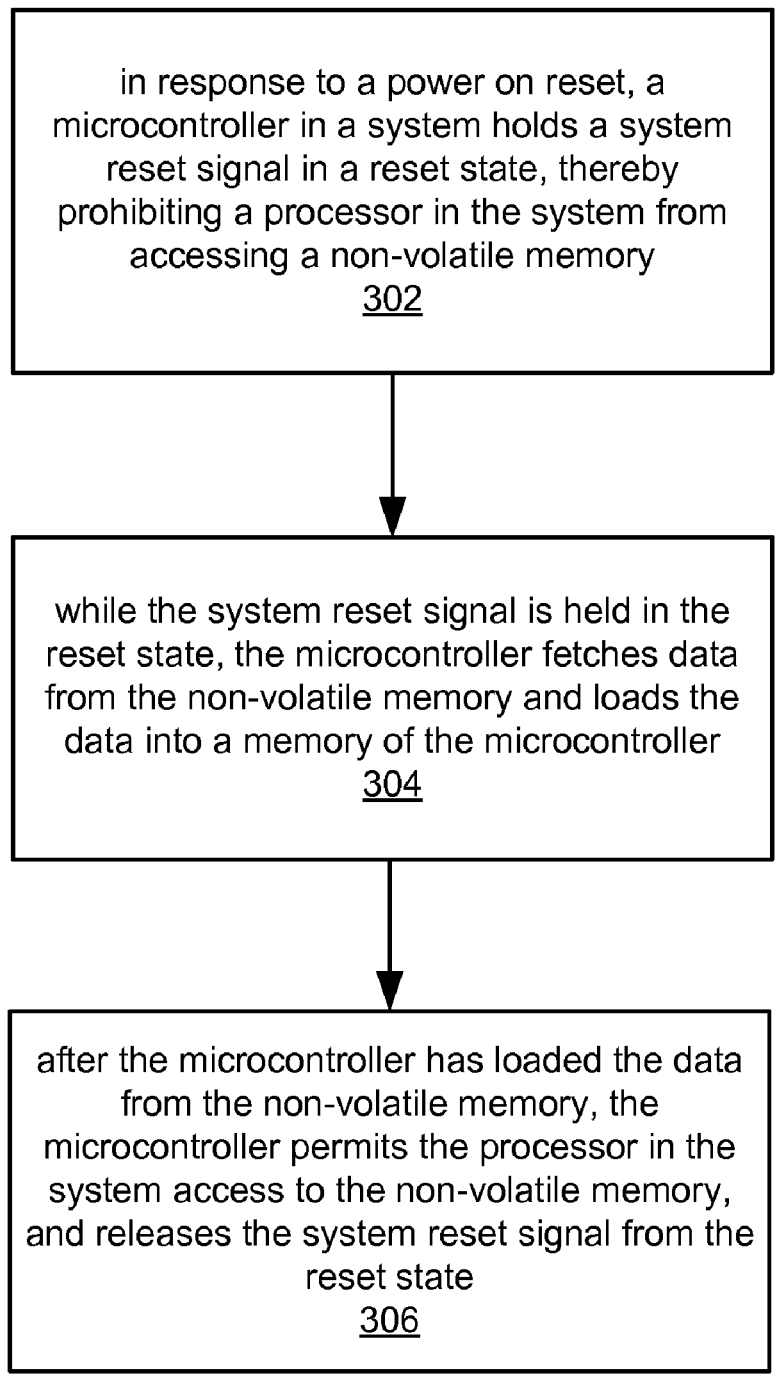
FIG. 3 is a flowchart of a method for sharing non-volatile memory between a processor and a microcontroller in a system, according to one embodiment.

FIG. 3—Method for Sharing Non-Volatile Memory Between Processors in a System FIG. 3 is a high-level flowchart of a method for sharing non-volatile memory between processors, e.g., between a processor and a microcontroller in a system, e.g., a computer system, according to one embodiment. It should be noted, however, that in other embodiments, any other types of memory may be used as desired, e.g., RAM, ROM, etc. In various embodiments, some of the method elements shown may be performed concurrently, in a different order than shown, or may be omitted. Additional method elements may also be performed as desired. As shown, this method may operate as follows.

In 302, in response to a system state change, such as, for example, power on reset (POR), system reset, or sleep mode, where a microcontroller, e.g., microcontroller 102, in a system is assured of safe access to a non-volatile memory, or can prevent the system from entering a state where a processor in the system can access the non-volatile memory, the microcontroller may set control signals or utilize software to cause access to the non-volatile memory to be with the microcontroller. In other words, when the system is changed to a state, e.g., a first state, in which the microcontroller 102 is guaranteed the ability to access the non-volatile memory safely, e.g., without interruption or interference by the processor, the microcontroller may hold the system in the state and switch access to the non-volatile memory from the processor to the microcontroller. Examples of this first state may include one or more of: a power on reset (POR) state, a system reset state, or a sleep state, among others.

Holding the system in this first state may prohibit the processor in the system from accessing the non-volatile memory in the system. Similarly, the state change may be invoked or caused by a management signal, such as a POR, system reset, sleep, signal, etc., which may include a software signal, event, token, handshake, etc. In one embodiment, holding the system in the first state may include holding a management signal in a corresponding state, e.g., holding a system reset signal in a reset state.

Note that the management signal, e.g., the POR and/or system reset, and/or any other type of management signal used, may or may not be invoked by the microcontroller. Thus, for example, in response to a received management signal, e.g., POR signal, or in response to generating the management signal, e.g., the POR signal, the microcontroller may generate or receive another management signal, e.g., the system reset signal, then hold or assert the other management signal in a specified state, e.g., a reset state.

As noted above with reference to FIG. 1B, in one embodiment, the microcontroller 102 may be situated between the system interface 106 (and therefore, the processor in the system) and the shared device 108, e.g., non-volatile memory, e.g., embedded flash memory, and thus may intercept communications between the system interface and the device, e.g., the non-volatile memory. As will be described below in more detail, in some embodiments, when the system is held in the first state, e.g., when the system reset signal is held in the reset state, the interface to the non-volatile memory may be configured by the microcontroller to preclude the processor in the system from accessing the non-volatile memory, e.g., via a switch.

Figure 4:
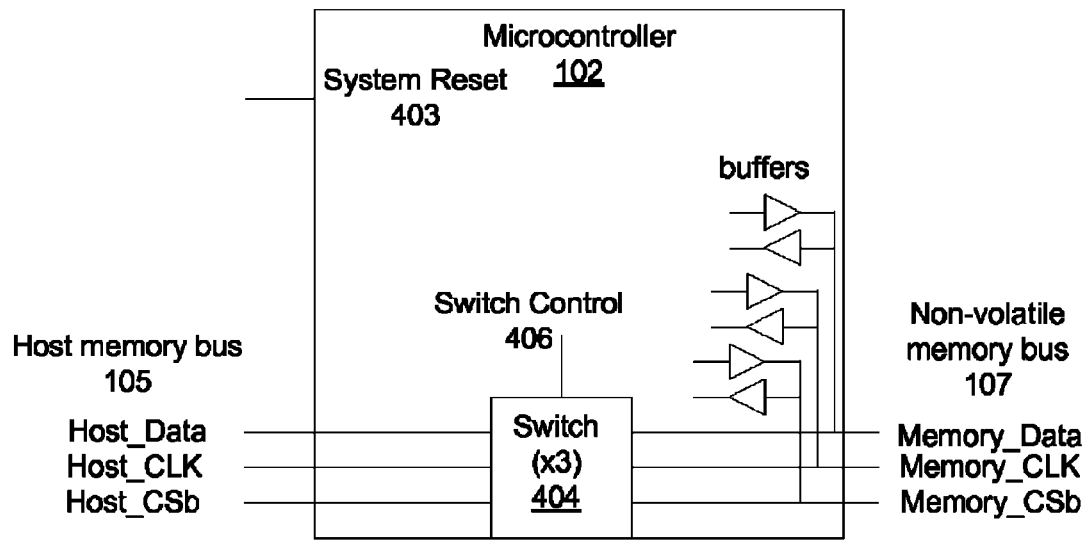
FIG. 4 illustrates a microcontroller, according to one embodiment of the invention.

FIG. 4 illustrates an exemplary embodiment of the microcontroller 102 of FIG. 1B, where the device 108 comprises non-volatile memory. As FIG. 4 shows, in this embodiment, the microcontroller 102 includes a system reset line 403 for communicating a reset signal, i.e., a system reset signal (or other management signal), e.g., to or from the system interface 106 over the system management bus 101 (see FIG. 1B). While many of the embodiments described herein reference a reset signal, it should be noted that in other embodiments, as mentioned above, other signals may be used as desired, e.g., any signal that corresponds with or invokes a suspension of non-volatile memory access by the CPU (or other specified processor) of the system, or which indicates a system state in which the microcontroller may have safe access to the non-volatile memory, including software events, tokens, handshakes, signals, etc. Note that FIG. 4 only illustrates features of the microcontroller that relate directly to embodiments of the present invention, i.e., components not necessary to understand the present invention have been omitted for brevity and simplicity.

As discussed above, in various embodiments, the switching of access to the shared device from the processor to the microcontroller may be performed via hardware, via software, or via a combination of software and hardware. As also discussed above, the term "signal" may denote a hardware signal and/or a software signal, e.g., a software event, message, token, handshake, etc., i.e., the term "management signal" may refer to a hardware signal or a software signal.

As also indicated above, in a preferred embodiment, the microcontroller controls and manages power on reset (POR) for the system, and thus may respond to and/or generate signals or software events or messages related to power on reset or system reset (or other management signals) in a way that preempts access to the device by the main processor of the system, thereby facilitating sharing a non-volatile memory that otherwise could not be shared. In some embodiments, the change in system state may be invoked or indicated by a management signal, e.g., a system reset or POR signal, generated or received by the microcontroller. It should be noted, however, that in some embodiments, control of the direction of the interface, i.e., control of which component of the system has access to the non-volatile memory, may be independent of the management (e.g., system reset or POR) signal. In other words, the microcontroller may control whether the non-volatile memory interface is directed to the processor of the system, or to the microcontroller, independent of the management (e.g., system reset or POR) signal.

Moreover, as noted above, in some embodiments, instead of, or in addition to, hardware signals, the microcontroller may respond to software events, messages, tokens, handshakes, etc., that may indicate when the system state is such that the microcontroller is assured safe access to the non-volatile memory.

In 304, while the system is in the first state, i.e., the state where the microcontroller is insured safe access to the device, or can prohibit access by the processor in the system to the non-volatile memory, and has properly configured access to the non-volatile memory, the microcontroller may retrieve or exchange data with the non-volatile memory. For example, while the system is held in the first state, the microcontroller may fetch program instructions/data from the non-volatile memory and load the program instructions/data into a memory of the microcontroller.

In one embodiment, holding the system in the first state may include holding a system reset signal (or other management signal) in the reset state, e.g., asserting system reset. While the system reset signal is held in the reset state, and the interface to the non-volatile memory is configured to only allow access by the microcontroller, the microcontroller may fetch program instructions/data from the non-volatile memory and load the program instructions/data into a memory of the microcontroller, or otherwise access the non-volatile memory. In other words, the microcontroller may hold the system reset signal in the reset state (e.g., on the system management bus 101 via system reset line 403), i.e., may maintain assertion of the system reset signal, and, while the system reset signal is asserted, may fetch, i.e., read, acquire, or otherwise receive (e.g., via invocation of a read by some other component of the system), program instructions/data from the non-volatile memory and load or write the program instructions/data into the microcontroller's memory. Note that the microcontroller's memory is preferably RAM (random access memory), although any type of re-writeable memory may be used as desired. As noted above, in some embodiments, the program instructions/data may include program firmware code, that may, for example, be usable by the embedded microcontroller for startup or reset functionality, e.g., for initializing the microcontroller, among other uses. In some embodiments, the microcontroller may be or include a peripheral device controller for a computer system. For example, in one exemplary embodiment, the embedded microcontroller may be a keyboard controller, and the non-volatile memory device 108 may store keyboard controller (KBC) code, although in other embodiments, any other program instructions/code or data may be used as desired.

Referring again to FIG. 4, as may be seen, in this embodiment, the microcontroller 102 may include or couple to the host memory bus 105, which, as indicated in FIG. 1B, may couple to the system interface 106, and may also include or couple to device bus 107, in this embodiment, a non-volatile memory bus 107, which may couple to the shared non-volatile memory device 108. Note that in the embodiment shown, the host memory bus 105 and the non-volatile memory bus 107 each includes three lines, one each for data, clock, and CSb signals, where CSb stands for Chip Select bar, which is a low true version of the Chip Select, and as such is part of the address structure of the block. In one embodiment, the host memory bus 105 and the non-volatile memory bus 107 are SPI (serial peripheral interface) buses, although other protocols may be used as desired. Note that in some embodiments, the host memory bus 105 and the non-volatile memory bus 107 may be considered the same bus, e.g., a memory bus, where the microcontroller 102 is inserted to switchably intercept and possibly redirect signals signals on the bus(es).

As FIG. 4 indicates, in this embodiment, the microcontroller 102 includes a switch 404 controlled by switch control 406, for providing switching functionality for the host memory bus 105 and the non-volatile memory bus 107, e.g., for the memory bus. In some embodiments, the switch 404 may comprise a Q switch, although it should be noted that the term "Q switch" may refer not only to actual Q switches, but to functional equivalents or analogs, as well. Said another way, the switch 404 may be a "conceptual Q switch", that may perform the functionality of a Q switch (or functionality similar to a Q switch), but which may implement this functionality in ways different from a Q switch. Note that in the embodiment of FIG. 4, the switch 404 includes a respective switch for each of the memory bus lines, as indicates by the "X3" (times three) label. Thus, each line on the memory bus may be switched independently, although in preferred embodiments, these lines may all be switched together, thereby suspending or inhibiting communications between the host interface 106 and the non-volatile memory 108. Of course, in other embodiments, any numbers of bus lines/switches may be used as desired.

It should be noted that in other embodiments, the microcontroller 102 may not include the switch 404, but rather may couple to a switch that is external to the microcontroller. One benefit of this approach is that it may save pins on the microcontroller.

As FIG. 4 further indicates, each line on the memory bus may be coupled to respective buffers for communicating data/signals between the memory bus (i.e., the device bus) and the microcontroller 102, where, as noted above, most of the internal components of the microcontroller 102 have been omitted from the figure. Thus, as FIG. 4 shows, the microcontroller 102 may be operable to switchably preempt and inhibit signal flow on the memory bus (i.e., the host memory bus 105 and the non-volatile memory bus 107) between the host interface 106 and the non-volatile memory 108, e.g., by placing the switches into a high-impedance state, and to fetch instructions/data from the non-volatile memory 108 while communication between the host interface 106 and the non-volatile memory 108 is suspended. Thus, the microcontroller may operate to configure the interface to the device (e.g., the switch) to regulate and enforce safe access to the device.

In 306, once the controller has completed the data retrieval or exchange with the non-volatile memory, or has determined that it may no longer be assured of safe access, the microcontroller may reconfigure the interface through control signals to enable access by the processor in the system, e.g., via a switch that controls access to the non-volatile memory.

In a more specific embodiment, after the microcontroller has loaded the program instructions/data from the non-volatile memory, the microcontroller may release the system reset signal from the reset state, thereby permitting the processor in the system access to the non-volatile memory. In other words, upon completion of the fetch of instructions/data from the non-volatile memory 108 by the microcontroller 102, the microcontroller may terminate the suspension or preemption of communications between host interface 106 and the non-volatile memory 108, thereby allowing resumption of such communications, e.g., via switch 404.

Thus, using embodiments of the above-described method, the microcontroller 102 may preempt or suspend communications with the non-volatile memory by the main CPU and read instructions/data from the non-volatile memory, e.g., to initialize the microcontroller 102 and/or perform other functionality prior to, or independent from, operation of the main system, i.e., the main CPU, thus sharing the non-volatile memory with the main system. For example, in some embodiments, the microcontroller may, in addition to initialization code/data, may also fetch program instructions and/or data related to pre-boot security operations, and may operate to perform such pre-boot security operations prior to boot-up of the main system, thereby providing additional security to the system.

Figure 5:
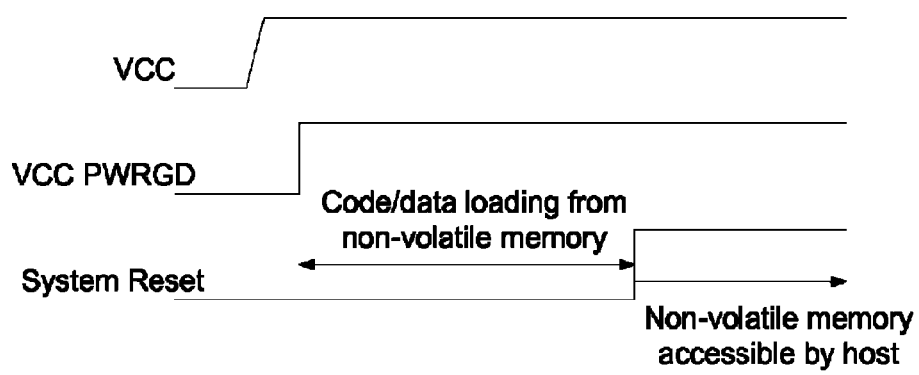
FIG. 5 illustrates an exemplary signal timing diagram, according to one embodiment.

FIG. 5 is a signal timing diagram that illustrates timing aspects of the above method, according to one embodiment. As FIG. 5 shows, in this particular embodiment, a VCC, i.e., power supply voltage, is provided, followed by a VCC PWRGD ("power good") signal indicating that the power supply voltage is valid, i.e., is at a valid level and is stable. It should be noted that the particular names or labels for these signals or voltages are exemplary only, and are not intended to limit the signals or voltages used to any particular names or representations.

As indicated, once the supply voltage is stable, the microcontroller 102 may hold the (generated or received) system reset signal in a reset state, here shown in the "low" state (e.g., a "low" or negative assertion state), during which time the microcontroller 102 may fetch and load instructions/data, e.g., controller firmware code, from the non-volatile memory, and during which, due to the system reset signal being held in the reset state, the host, i.e., the main system CPU, is inhibited from accessing the non-volatile memory. As FIG. 5 also shows, once this loading is done, the reset signal is de-asserted (shown in FIG. 5 as being put into the "high" state), after which the non-volatile memory is accessible by the host or main system CPU.

Thus, the microcontroller 102 may gracefully share use of the main system's non-volatile memory. It should be noted that in other embodiments, additional microcontrollers may also share this non-volatile memory (or device) with the host or main system CPU, using the techniques described above. In further embodiments, such sharing of non-volatile memory may also be used in other ways. For example, in some embodiments, a plurality of microcontrollers may share a non-volatile memory (e.g., that is not used by the main system CPU), where each microcontroller may in turn suspend or prevent access to the non-volatile memory by the other microcontrollers while it loads instructions/data from the memory. Thus, various embodiments described with reference to FIG. 3 may allow an embedded microcontroller to upload its firmware and data from a non-volatile memory device that is already present in the system and therefore save the cost and avoid issues associated with a private flash or ROM storage for the microcontroller.

Note that in various embodiments, the system changing to a state where the microcontroller is assured safe access to the non-volatile memory (or device) may be performed or mediated by software or hardware. In other words, in some embodiments, the state change may be in response to hardware signals, such as POR signals, etc., but in other embodiments, the state change may be in response to software events, tokens, software conditions, software messages, software handshakes, and so forth. Said another way, embodiments of the present invention are intended to cover virtually any case where the embedded controller can determine that it can safely take control of the shared non-volatile memory, whether the "safe" system state is mediated or signaled via software or hardware.

Thus, various embodiments of the invention described herein may allow an embedded microcontroller and a processor in a system to share a device, e.g., a non-volatile memory, that is not designed to be shared.

We claim:

1. A system, comprising:
   a non-volatile memory;
   a processor; and
   a microcontroller coupled to the non-volatile memory and to the processor, wherein the microcontroller is configured to:
   in response to a change in system state to a first state wherein the microcontroller is assured safe access to the non-volatile memory, hold the system in the first state and switch access to the non-volatile memory from the processor to the microcontroller;
   while the system is held in the first state, fetch program instructions or data from the non-volatile memory and load the program instructions or data into a memory of the microcontroller; and
   after the program instructions or data have been loaded, switch access to the non-volatile memory from the microcontroller to the processor, and release the system from the first state.

2. The system of claim 1, wherein the change in system state to the first state is performed by software.

3. The system of claim 1, wherein the first state comprises one or more of:
   a power on reset (POR) state;
   a system reset state; or
   a sleep state.

4. The system of claim 1, wherein the program instructions or data comprise firmware code or data for the microcontroller.

5. The system of claim 1, the microcontroller is a peripheral device controller for a computer system.

6. A method for sharing a non-volatile memory between a processor and a microcontroller in a system, comprising:
   in response to a change in system state to a first state wherein the microcontroller is assured safe access to the non-volatile memory, holding the system in the first state and switching access to the non-volatile memory from the processor to the microcontroller;
   while the system is held in the first state, fetching program instructions or data from the non-volatile memory and loading the program instructions or data into a memory of the microcontroller; and
   after the program instructions or data have been loaded, switching access to the non-volatile memory from the microcontroller to the processor, and releasing the system from the first state.

7. The method of claim 6, wherein the change in system state to the first state is performed by software.

8. The method of claim 6, wherein the first state comprises one or more of:
   a power on reset (POR) state;
   a system reset state; or
   a sleep state.

9. The method of claim 6, wherein the program instructions or data comprise firmware code or data for the microcontroller.

10. The method of claim 6, the microcontroller is a peripheral device controller for a computer system.

11. A system, comprising:
    a non-volatile memory;
    a processor; and
    a microcontroller coupled to the non-volatile memory and to the processor, wherein the microcontroller is configured to:
    in response to a power on reset, hold a system reset signal in a reset state, thereby prohibiting the processor from accessing the non-volatile memory;

while the system reset signal is held in the reset state, fetch program instructions or data from the non-volatile memory and load the program instructions or data into a memory of the microcontroller; and after the program instructions or data have been loaded, permit the processor in the system access to the non-volatile memory, and release the system reset signal from the reset state.

12. The system of claim 11, wherein the program instructions or data comprise firmware code or data for the microcontroller.

13. The system of claim 12, the microcontroller is a peripheral device controller for a computer system.

14. The system of claim 11, wherein the microcontroller is coupled to the non-volatile memory via a non-volatile memory bus, and wherein the microcontroller is operable to fetch the program instructions or data from the non-volatile memory via the non-volatile memory bus.

15. The system of claim 14, wherein the microcontroller is coupled to the processor via a host memory bus, and wherein the microcontroller is operable to switchably intercept or pass communications between the processor and the non-volatile memory.

16. The system of claim 15, wherein the microcontroller comprises or is coupled to a switch, interposed between the non-volatile memory bus and the host memory bus, wherein the switch is controllable by the microcontroller to switchably intercept or pass communications between the processor and the non-volatile memory.

17. A method for sharing a non-volatile memory between a processor and a microcontroller in a system, comprising:

in response to a power on reset, holding a system reset signal in a reset state, thereby prohibiting the processor from accessing the non-volatile memory;

while the system reset signal is held in the reset state, fetching program instructions or data from the non-volatile memory and loading the program instructions or data into a memory of the microcontroller; and after the program instructions or data have been loaded, permitting the processor in the system access to the non-volatile memory, and releasing the system reset signal from the reset state.

18. The method of claim 17, wherein the program instructions or data comprise firmware code or data for the microcontroller.

19. The method of claim 17, the microcontroller is a peripheral device controller for a computer system.

20. The method of claim 17, wherein the microcontroller is coupled to the processor via a system reset bus, and wherein the microcontroller is operable to assert the system reset signal over the system reset bus.

21. The method of claim 17, wherein the microcontroller is coupled to the non-volatile memory via a non-volatile memory bus, and wherein the microcontroller is operable to fetch the program instructions or data from the non-volatile memory via the non-volatile memory bus.

22. The method of claim 21, wherein the microcontroller is coupled to the processor via a host memory bus, and wherein the microcontroller is operable switchably intercept or pass communications between the processor and the non-volatile memory.

23. The method of claim 22, wherein the microcontroller comprises or is coupled to a switch, interposed between the non-volatile memory bus and the host memory bus, wherein the switch is controllable by the microcontroller to switchably intercept or pass communications between the processor and the non-volatile memory.

* * * * *

UNITED STATES PATENT AND TRADEMARK OFFICE
CERTIFICATE OF CORRECTION

PATENT NO. : 7,930,576 C1  
APPLICATION NO. : 90/011754  
DATED : September 4, 2012  
INVENTOR(S) : Ian F. Harris and Drew J. Dutton Page 1 of 1

It is certified that error appears in the above-identified patent and that said Letters Patent is hereby corrected as shown below:

In the Claims:

Column 12
Lines 24-25, in claim 181, delete "host memory and" and insert -- host memory bus and --, therefor.

Signed and Sealed this
Fifteenth Day of October, 2013

Teresa Stanek Rea
*Deputy Director of the United States Patent and Trademark Office*

(12) EX PARTE REEXAMINATION CERTIFICATE (9280th)
United States Patent
Harris et al.

(10) Number: US 7,930,576 C1
(45) Certificate Issued: Sep. 4, 2012

(54) SHARING NON-SHARABLE DEVICES BETWEEN AN EMBEDDED CONTROLLER AND A PROCESSOR IN A COMPUTER SYSTEM

(75) Inventors: Ian F. Harris, Kings Park, NY (US); Drew J. Dutton, Austin, TX (US)

(73) Assignee: Standard Microsystems Corporation, Hauppauge, NY (US)

Reexamination Request:
No. 90/011,754, Jun. 21, 2011

Reexamination Certificate for:
Patent No.: 7,930,576
Issued: Apr. 19, 2011
Appl. No.: 11/958,601
Filed: Dec. 18, 2007

Related U.S. Application Data

(60) Provisional application No. 60/910,863, filed on Apr. 10, 2007.

(51) Int. Cl.
*G06F 1/26* (2006.01)
*G06F 15/177* (2006.01)

(52) U.S. Cl. .............................. 713/324; 713/100; 713/2
(58) Field of Classification Search .................. None
See application file for complete search history.

(56) References Cited

To view the complete listing of prior art documents cited during the proceeding for Reexamination Control Number 90/011,754, please refer to the USPTO's public Patent Application Information Retrieval (PAIR) system under the Display References tab.

*Primary Examiner* — B. James Peikari

(57) ABSTRACT

System and method for sharing a device, e.g., non-volatile memory, between a host processor and a microcontroller. In response to system state change to a first state wherein the microcontroller is assured safe access to the non-volatile memory (e.g., in response to power-on reset, system reset, sleep state, etc.), the microcontroller holds the system in the first state (e.g., system reset), and switches access to the non-volatile memory from the processor to the microcontroller. While the system is held in the first state, the microcontroller accesses the device (e.g., non-volatile memory), e.g., fetches program instructions/data from the non-volatile memory and loads the program instructions/data into a memory of the microcontroller. After the access, the microcontroller changes or allows change of the system state, e.g., switches access to the device, e.g., the non-volatile memory, from the microcontroller to the processor, and releases the system from the first state.

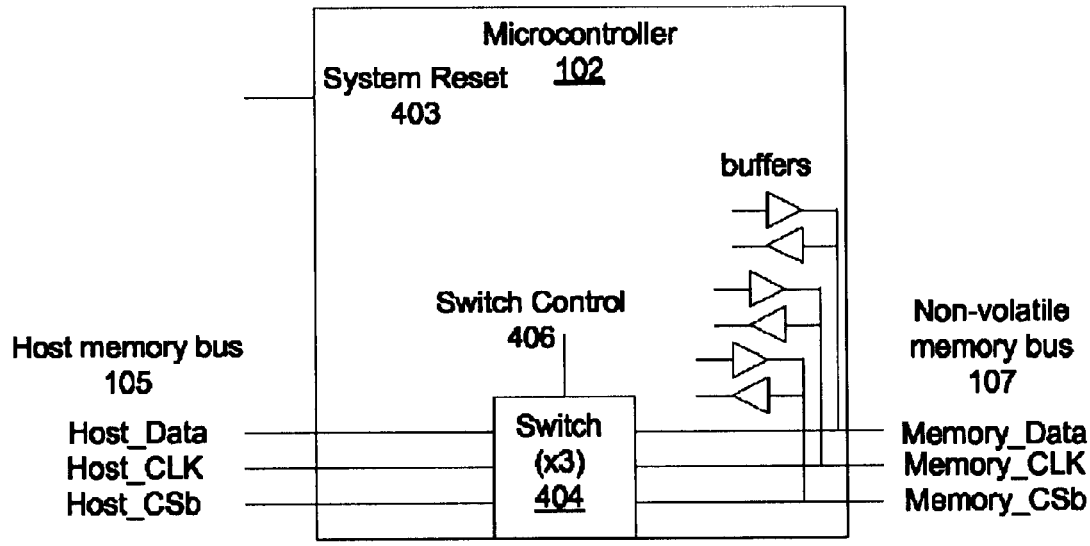

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-23 is confirmed.

New claims 24-213 are added and determined to be patentable.

24. *The system of claim 1, wherein the change in system state to the first state is performed by hardware.*

25. *The system of claim 1, wherein the change in system state to the first state is in response to a hardware signal.*

26. *The system of claim 1, wherein the change in system state to the first state is in response to a software event.*

27. *The system of claim 1, wherein the change in system state to the first state is in response to a token.*

28. *The system of claim 1, wherein the change in system state to the first state is in response to the system passing the microcontroller a token which grants the microcontroller ownership of the memory through a software handshake.*

29. *The system of claim 1, wherein the change in system state to the first state is in response to a software condition.*

30. *The system of claim 1, wherein the change in system state to the first state is in response to a software message.*

31. *The system of claim 1, wherein the change in system state to the first state is in response to a software handshake.*

32. *The system of claim 1, wherein the first state comprises a power on reset (POR) state.*

33. *The system of claim 1, wherein the first state comprises a system reset state.*

34. *The system of claim 1, wherein the first state comprises a sleep state.*

35. *The system of claim 1, wherein to hold the system in the first state, the microcontroller is configured to:*

*in response to a power on reset, hold a system reset signal in a reset state, thereby prohibiting the processor from accessing the non-volatile memory.*

36. *The system of claim 35, wherein to fetch program instructions or data from the non-volatile memory and load the program instructions or data into a memory of the microcontroller while the system is held in the first state, the microcontroller is configured to:*

*fetch the program instructions or data from the non-volatile memory and load the program instructions or data into a memory of the microcontroller while the system reset signal is held in the reset state.*

37. *The system of claim 35, wherein to switch access to the non-volatile memory from the microcontroller to the processor, and release the system from the first state after the program instructions or data have been loaded, the microcontroller is configured to:*

*after the program instructions or data have been loaded, permit the processor in the system access to the non-volatile memory, and release the system reset signal from the reset state.*

38. *The system of claim 1, wherein the first state comprises a state wherein it is known by the microcontroller that the system cannot or will not access the device.*

39. *The system of claim 1, wherein the microcontroller is included within a system-on-chip (SoC).*

40. *The system of claim 1, wherein the microcontroller comprises a keyboard controller for managing or controlling communications between a keyboard and the processor.*

41. *The system of claim 40, wherein the non-volatile memory stores keyboard controller (KBC) code.*

42. *The system of claim 1, wherein the program instructions or data are usable by the microcontroller for startup, general, or reset functionality.*

43. *The system of claim 1, wherein the program instructions or data are usable by the microcontroller for initializing the microcontroller.*

44. *The system of claim 1, wherein during system shutdown, the microcontroller is further configured to:*

*configure the non-volatile memory to allow access to the non-volatile memory only by the microcontroller before power-off;*

*queue one or more writes or other exchanges with the non-volatile memory; and*

*complete the one or more writes or other exchanges with the non-volatile memory before final power-off.*

45. *The system of claim 1, further comprising:*

*a device interface coupled to the non-volatile memory, wherein the device interface controls access to the non-volatile memory, wherein during system shutdown, the microcontroller is further configured to:*

*redirect the device interface to allow access to the non-volatile memory only by the microcontroller before power-off;*

*queue one or more writes or other exchanges with the non-volatile memory; and*

*complete the one or more writes or other exchanges with the non-volatile memory before final power-off.*

46. *The system of claim 1, further comprising:*

*one or more additional processors, each coupled to the microcontroller and the non-volatile memory, and wherein the microcontroller has control over the power or execution states of the processor and the one or more additional processors for sharing the non-volatile memory between the plurality of processors.*

47. *The system of claim 1, further comprising:*

*one or more additional microcontrollers, each coupled to the processor and the non-volatile memory, wherein each additional microcontroller is configured to share the non-volatile memory with the processor.*

48. *The system of claim 1, further comprising:*

*one or more additional microcontrollers, each coupled to the processor and the non-volatile memory, wherein each additional microcontroller is configured to share the non-volatile memory, and wherein each microcontroller is configured to suspend or prevent access to the non-volatile memory by other microcontrollers and the processor while it accesses the non-volatile memory.*

49. *The system of claim 1, further comprising:*

*a system interface, coupled to the processor, wherein the microcontroller is situated between the system interface and the non-volatile memory, and wherein the microcontroller is configured to intercept communications between the system interface and the non-volatile memory; and*

*a device interface, included in or associated with the non-volatile memory, wherein the device interface is config-* ured to direct or restrict access to the non-volatile memory by the processor or the microcontroller.

50. The system of claim 49, wherein the microcontroller is configured to set one or more control signals to configure or redirect the device interface to grant exclusive access to the non-volatile memory to the microcontroller.

51. The system of claim 1, wherein the non-volatile memory comprises flash memory.

52. The system of claim 1, wherein the change in system state to the first state is in response to a management signal, wherein to hold the system in the first state, the microcontroller is further configured to hold the management signal in a corresponding state, or to hold or assert another management signal in a specified state.

53. The system of claim 52, further comprising:
a device interface, included in or associated with the non-volatile memory, wherein the device interface is configured by the microcontroller to direct or restrict access to the non-volatile memory by the processor or the microcontroller independent of the management signal.

54. The system of claim 52, further comprising:
a system interface, coupled to the processor, and further coupled to the microcontroller via a system management bus configured for communicating management signals between the system interface and the microcontroller.

55. The system of claim 52, further comprising:
a system interface, coupled to the processor, and further coupled to the microcontroller via a system interface bus configured for communicating management signals between the system interface and the microcontroller.

56. The system of claim 52, wherein the management signal or the another management signal is invoked by the microcontroller.

57. The system of claim 52, wherein the management signal or the another management signal is not invoked by the microcontroller.

58. The system of claim 52, wherein the management signal or the another management signal is a software signal.

59. The system of claim 52, wherein the management signal or the other management signal is a hardware signal.

60. The system of claim 1, wherein switching access to the non-volatile memory from the processor to the microcontroller and from the microcontroller to the processor is performed via software.

61. The system of claim 1, wherein switching access to the non-volatile memory from the processor to the microcontroller and from the microcontroller to the processor is performed via hardware.

62. The system of claim 1, wherein switching access to the non-volatile memory from the processor to the microcontroller and from the microcontroller to the processor is performed via a combination of software and hardware.

63. The system of claim 1, wherein the change in system state to the first state is not dependent on a management signal.

64. The system of claim 1, wherein to fetch program instructions or data from the non-volatile memory and load the program instructions or data into a memory of the microcontroller, the microcontroller is configured to:
fetch initialization code or data for the system.

65. The system of claim 64, wherein to fetch program instructions or data from the non-volatile memory and load the program instructions or data into a memory of the microcontroller, the microcontroller is further configured to:
fetch program instructions or data related to pre-boot security operations; and
perform the pre-boot security operations prior to boot-up of the system.

66. The system of claim 1, wherein the microcontroller is coupled to the non-volatile memory via a non-volatile memory bus, and wherein the microcontroller is operable to fetch the program instructions or data from the non-volatile memory via the non-volatile memory bus.

67. The system of claim 66, wherein the microcontroller is coupled to the processor via a host memory bus, and wherein the microcontroller is operable to switchably intercept or pass communications between the processor and the non-volatile memory.

68. The system of claim 67, wherein the host memory bus and the non-volatile memory bus are SPI (serial peripheral interface) buses.

69. The system of claim 67, wherein the microcontroller comprises or is coupled to a switch, interposed between the non-volatile memory bus and the host memory bus, wherein the switch is controllable by the microcontroller to switchably intercept or pass communications between the processor and the non-volatile memory.

70. The system of claim 69, wherein the switch comprises a Q switch or a conceptual Q switch.

71. The system of claim 69, wherein to switchably intercept or pass communications between the processor and the non-volatile memory, the microcontroller is configured to place the switch into a high-impedance state.

72. The system of claim 69, wherein to switch access to the non-volatile memory from the microcontroller to the processor, and release the system from the first state, the microcontroller is configured to:
reconfigure the access to the non-volatile memory via the switch, and release the system from the first state, thereby permitting the processor access to the non-volatile memory.

73. The system of claim 69,
wherein the first state comprises a reset state, wherein to hold the system in the first state, the microcontroller is configured to maintain assertion of a system reset signal; and
wherein to switch access to the non-volatile memory from the microcontroller to the processor, and release the system from the first state, the microcontroller is configured to:
terminate a prior suspension or preemption of communications between the host interface and the non-volatile memory via the switch, thereby allowing resumption of the communications; and
de-assert the system reset signal.

74. The system of claim 67, wherein the host memory bus and the non-volatile memory bus each comprises:
a data line;
a clock line; and
a CSb (Chip Select bar) line.

75. The system of claim 67, wherein the host memory bus and the non-volatile memory bus each comprises a plurality of lines.

76. The system of claim 75, wherein each line of the host memory bus and the non-volatile memory bus is independently switchable.

77. The system of claim 75, further comprising:
a system interface, coupled to the processor, and further coupled to the microcontroller for communicating signals between the system interface and the microcontroller;
wherein the lines of the host memory bus and the non-volatile memory bus are switchable together to suspend or inhibit communications between the system interface and the non-volatile memory.

78. The system of claim 75, wherein the lines of the host memory bus and the non-volatile memory bus are coupled to respective buffers for communicating data or signals between the non-volatile memory bus and the microcontroller.

79. The system of claim 78, further comprising:
a device interface, included in or associated with the non-volatile memory, wherein the device interface is configured by the microcontroller to:
when the system is held in the first state, preclude the processor from accessing the non-volatile memory.

80. The system of claim 79, wherein the microcontroller is further configured to:
once the microcontroller has completed fetching program instructions or data from the non-volatile memory, or has determined that it is no longer assured of safe access to the non-volatile memory, reconfigure the device interface via control signals to enable access by the processor to the non-volatile memory.

81. The system of claim 1,
wherein the first state comprises a reset state, wherein to hold the system in the first state, the microcontroller is configured to maintain assertion of a system reset signal; and
wherein to switch access to the non-volatile memory from the microcontroller to the processor, and release the system from the first state, the microcontroller is configured to:
terminate a prior suspension or preemption of communications between the processor and the non-volatile memory, thereby allowing communications to occur between the processor and the non-volatile memory; and
de-assert the system reset signal.

82. The system of claim 1, further comprising:
a device interface, included in or associated with the non-volatile memory, wherein the device interface is configured by the microcontroller to:
when the system is held in the first state, preclude the processor from accessing the non-volatile memory.

83. The system of claim 1, wherein the microcontroller is further configured to:
while the system is held in the first state, exchange data or program instructions with the non-volatile memory.

84. The system of claim 83, wherein to exchange data or program instructions with the non-volatile memory, the microcontroller is configured to:
invoke a read or write by another component of the system.

85. The system of claim 1, further comprising:
a system interface, coupled to the processor, and further coupled to the microcontroller via a system management bus configured for communicating management signals between the system interface and the microcontroller;
wherein the microcontroller comprises a system reset line for communicating a reset signal or other signal to or from the system interface.

86. The system of claim 85, wherein the reset signal or other signal corresponds with or invokes a suspension of non-volatile memory access by the processor.

87. The system of claim 85, wherein the reset signal or other signal indicates a system state in which the microcontroller has safe access to the non-volatile memory.

88. The system of claim 85, wherein to hold the system in the first state, the microcontroller is configured to hold the system reset signal or other signal in a reset state.

89. The method of claim 6, wherein the change in system state to the first state is performed by hardware.

90. The method of claim 6, wherein the change in system state to the first state is in response to a hardware signal.

91. The method of claim 6, wherein the change in system state to the first state is in response to a software event.

92. The method of claim 6, wherein the change in system state to the first state is in response to a token.

93. The method of claim 6, wherein the change in system state to the first state is in response to the system passing the microcontroller a token which grants the microcontroller ownership of the memory through a software handshake.

94. The method of claim 6, wherein the change in system state to the first state is in response to a software condition.

95. The method of claim 6, wherein the change in system state to the first state is in response to a software message.

96. The method of claim 6, wherein the change in system state to the first state is in response to a software handshake.

97. The method of claim 6, wherein the first state comprises a power on reset (POR) state.

98. The method of claim 6, wherein the first state comprises a system reset state.

99. The method of claim 6, wherein the first state comprises a sleep state.

100. The method of claim 6, wherein holding the system in the first state comprises, in response to a power on reset, holding a system reset signal in a reset state, thereby prohibiting the processor from accessing the non-volatile memory.

101. The method of claim 100, wherein said fetching program instructions or data from the non-volatile memory and loading the program instructions or data into a memory of the microcontroller while the system is held in the first state occur while the system reset signal is held in the reset state.

102. The method of claim 100, wherein said switching access to the non-volatile memory from the microcontroller to the processor comprises permitting the processor in the system to access the non-volatile memory, and wherein releasing the system from the first state after the program instructions or data have been loaded comprises releasing the system reset signal from the reset state.

103. The method of claim 6, wherein the first state comprises a state wherein it is known by the microcontroller that the system cannot or will not access the device.

104. The method of claim 6, wherein the microcontroller is included within a system-on-chip (SoC).

105. The method of claim 6, wherein the microcontroller comprises a keyboard controller for managing or controlling communications between a keyboard and the processor.

106. The method of claim 105, wherein the non-volatile memory stores keyboard controller (KBC) code.

107. The method of claim 6, wherein the program instructions or data are usable by the microcontroller for startup, general, or reset functionality.

108. The method of claim 6, wherein the program instructions or data are usable by the microcontroller for initializing the microcontroller.

109. The method of claim 6, further comprising:
during system shutdown:
configuring the non-volatile memory to allow access to the non-volatile memory only by the microcontroller before power-off;
queuing one or more writes or other exchanges with the non-volatile memory; and
completing the one or more writes or other exchanges with the non-volatile memory before final power-off.

110. The method of claim 6, further comprising:
during system shutdown:
redirecting a device interface to allow access to the non-volatile memory only by the microcontroller before power-off, wherein the device interface is coupled to the non-volatile memory and controls access to the non-volatile memory;
queuing one or more writes or other exchanges with the non-volatile memory; and
completing the one or more writes or other exchanges with the non-volatile memory before final power-off.

111. The method of claim 6, wherein the system further includes one or more additional processors, each coupled to the microcontroller and the non-volatile memory, and wherein the method further includes controlling the power or execution states of the processor and the one or more additional processors for sharing the non-volatile memory between the plurality of processors.

112. The method of claim 6, wherein the system further includes one or more additional microcontrollers, each coupled to the processor and the non-volatile memory, and wherein the method further includes each additional microcontroller sharing the non-volatile memory with the processor.

113. The method of claim 6, wherein the system further includes one or more additional microcontrollers, each coupled to the processor and the non-volatile memory, and, wherein the method further includes:
each additional microcontroller sharing the non-volatile memory; and
each microcontroller suspending or preventing access to the non-volatile memory by other microcontrollers and the processor while it accesses the non-volatile memory.

114. The method of claim 6, further comprising:
intercepting communications between a system interface and the non-volatile memory, wherein the system interface is coupled to the processor, and wherein the microcontroller is situated between the system interface and the non-volatile memory; and
a device interface directing or restricting access to the non-volatile memory by the processor or the microcontroller, wherein the device interface is included in or associated with the non-volatile memory.

115. The method of claim 114, wherein the microcontroller is configured to set one or more control signals to configure or redirect the device interface to grant exclusive access to the non-volatile memory to the microcontroller.

116. The method of claim 6, wherein the non-volatile memory comprises flash memory.

117. The method of claim 6, wherein the change in system state to the first state is in response to a management signal, wherein to hold the system in the first state, the microcontroller is further configured to hold the management signal in a corresponding state, or to hold or assert another management signal in a specified state.

118. The method of claim 117, further comprising:
a device interface directing or restricting access to the non-volatile memory by the processor or the microcontroller independent of the management signal, wherein the device interface is included in or associated with the non-volatile memory.

119. The method of claim 117, further comprising:
a system interface communicating management signals between the system interface and the microcontroller, wherein the system interface is coupled to the processor, and further coupled to the microcontroller via a system management bus.

120. The method of claim 117, further comprising:
a system interface communicating management signals between the system interface and the microcontroller, wherein the system interface is coupled to the processor, and further coupled to the microcontroller via a system interface bus.

121. The method of claim 117, wherein the management signal or the another management signal is invoked by the microcontroller.

122. The method of claim 117, wherein the management signal or the another management signal is not invoked by the microcontroller.

123. The method of claim 117, wherein the management signal or the another management signal is a software signal.

124. The method of claim 117, wherein the management signal or the other management signal is a hardware signal.

125. The method of claim 6, wherein switching access to the non-volatile memory from the processor to the microcontroller and from the microcontroller to the processor is performed via software.

126. The method of claim 6, wherein switching access to the non-volatile memory from the processor to the microcontroller and from the microcontroller to the processor is performed via hardware.

127. The method of claim 6, wherein switching access to the non-volatile memory from the processor to the microcontroller and from the microcontroller to the processor is performed via a combination of software and hardware.

128. The method of claim 6, wherein the change in system state to the first state is not dependent on a management signal.

129. The method of claim 6, wherein said fetching program instructions or data from the non-volatile memory further comprises fetching initialization code or data for the system.

130. The method of claim 129, further comprising:
fetching program instructions or data related to pre-boot security operations; and
performing the pre-boot security operations prior to boot-up of the system.

131. The method of claim 6, wherein fetching the program instructions or data from the non-volatile memory occurs via a non-volatile memory bus that couples the microcontroller and the non-volatile memory.

132. The method of claim 131, wherein the microcontroller is coupled to the processor via a host memory bus, and wherein the method further comprises the microcontroller switchably intercepting or passing communications between the processor and the non-volatile memory.

133. The method of claim 132, wherein the host memory bus and the non-volatile memory bus are SPI (serial peripheral interface) buses.

134. The method of claim 132, wherein the microcontroller comprises or is coupled to a switch, interposed between the non-volatile memory bus and the host memory bus, and wherein the microcontroller switchably intercepting or passing communications comprises the microcontroller controlling the switch to switchably intercept or pass communications between the processor and the non-volatile memory.

135. The method of claim 134, wherein the switch comprises a Q switch or a conceptual Q switch.

136. The method of claim 134, wherein switchably intercepting communications between the processor and the non-volatile memory comprises placing the switch into a high-impedance state.

137. The method of claim 134, wherein switching access to the non-volatile memory from the microcontroller to the processor comprises reconfiguring the access to the non-volatile memory via the switch.

138. The method of claim 134,
wherein the first state comprises a reset state, wherein holding the system in the first state comprises maintaining assertion of a system reset signal; and
wherein switching access to the non-volatile memory from the microcontroller to the processor comprises terminating a prior suspension or preemption of communications between the host interface and the non-volatile memory via the switch, thereby allowing resumption of the communications; and
wherein releasing the system from the first state comprises de-asserting the system reset signal.

139. The method of claim 132, wherein the host memory bus and the non-volatile memory bus each comprises:
a data line;
a clock line; and
a CSb (Chip Select bar) line.

140. The method of claim 132, wherein the host memory bus and the non-volatile memory bus each comprises a plurality of lines.

141. The method of claim 140, wherein each line of the host memory bus and the non-volatile memory bus is independently switchable.

142. The method of claim 140, further comprising:
switching the lines of the host memory bus and the non-volatile memory bus together to suspend or inhibit communications between a system interface and the non-volatile memory, wherein the system interface is coupled to the processor, and further coupled to the microcontroller for communicating signals between the system interface and the microcontroller.

143. The method of claim 140, wherein the lines of the host memory bus and the non-volatile memory bus are coupled to respective buffers for communicating data or signals between the non-volatile memory bus and the microcontroller.

144. The method of claim 143, further comprising:
when the system is held in the first state, precluding, by a device interface, the processor from accessing the non-volatile memory, wherein the device interface is included in or associated with the non-volatile memory.

145. The method of claim 140, further comprising:
once the microcontroller has completed fetching program instructions or data from the non-volatile memory, or has determined that it is no longer assured of safe access to the non-volatile memory, reconfiguring the device interface via control signals to enable access by the processor to the non-volatile memory.

146. The method of claim 6,
wherein the first state comprises a reset state, wherein the holding the system in the first state comprises maintaining assertion of a system reset signal; and
wherein switching access to the non-volatile memory from the microcontroller to the processor comprises terminating a prior suspension or preemption of communications between the host interface and the non-volatile memory via the switch, thereby allowing resumption of the communications; and
wherein releasing the system from the first state comprises de-asserting the system reset signal.

147. The method of claim 6, further comprising:
when the system is held in the first state, precluding, by a device interface, the processor from accessing the non-volatile memory, wherein the device interface is included or associated with the non-volatile memory.

148. The method of claim 6, further comprising:
while the system is held in the first state, the microcontroller exchanging data or program instructions with the non-volatile memory.

149. The method of claim 148, wherein the microcontroller exchanging data or program instructions with the non-volatile memory comprises invoking a read or write by another component of the system.

150. The method of claim 6, further comprising:
communicating management signals between a system interface and the microcontroller, wherein the system interface is coupled to the processor and is further coupled to the microcontroller via a system management bus, and wherein the microcontroller comprises a system reset line for communicating a reset signal or other signal to or from the system interface.

151. The method of claim 150, wherein the reset signal or other signal corresponds with or invokes a suspension of non-volatile memory access by the processor.

152. The method of claim 150, wherein the reset signal or other signal indicates a system state in which the microcontroller has safe access to the non-volatile memory.

153. The system of claim 150, wherein holding the system in the first state comprises the microcontroller holding the system reset signal or other signal in a reset state.

154. The method of claim 6, wherein said holding the system in the first state is performed by the microcontroller.

155. The method of claim 6, wherein said switching access to the non-volatile memory from the processor to the microcontroller is performed by the microcontroller.

156. The method of claim 6, wherein said fetching program instructions or data from the non-volatile memory is performed by the microcontroller.

157. The method of claim 6, wherein said loading the program instructions or data into a memory of the microcontroller is performed by the microcontroller.

158. The method of claim 6, wherein said switching access to the non-volatile memory from the microcontroller to the processor is performed by the microcontroller.

159. The method of claim 6, wherein said releasing the system from the first state is performed by the microcontroller.

160. The system of claim 11, wherein the microcontroller is included within a system-on-chip (SoC).

161. The system of claim 11, wherein the microcontroller comprises a keyboard controller for managing or controlling communications between a keyboard and the processor.

162. The system of claim 161, wherein the non-volatile memory stores keyboard controller (KBC) code.

163. The system of claim 11, wherein the program instructions or data are usable by the microcontroller for startup, general, or reset functionality.

164. The system of claim 11, wherein the program instructions or data are usable by the microcontroller for initializing the microcontroller.

165. The system of claim 11, wherein during system shutdown, the microcontroller is further configured to:
configure the non-volatile memory to allow access to the non-volatile memory only by the microcontroller before power-off;
queue one or more writes or other exchanges with the non-volatile memory; and complete the one or more writes or other exchanges with the non-volatile memory before final power-off.

166. The system of claim 11, further comprising:
a device interface coupled to the non-volatile memory, wherein the device interface controls access to the non-volatile memory, wherein during system shutdown, the microcontroller is further configured to:
redirect the device interface to allow access to the non-volatile memory only by the microcontroller before power-off;
queue one or more writes or other exchanges with the non-volatile memory; and
complete the one or more writes or other exchanges with the non-volatile memory before final power-off.

167. The system of claim 11, further comprising:
one or more additional processors, each coupled to the microcontroller and the non-volatile memory, and wherein the microcontroller has control over the power or execution states of the processor and the one or more additional processors for sharing the non-volatile memory between the plurality of processors.

168. The system of claim 11, further comprising:
one or more additional microcontrollers, each coupled to the processor and the non-volatile memory, wherein each additional microcontroller is configured to share the non-volatile memory with the processor.

169. The system of claim 11, further comprising:
one or more additional microcontrollers, each coupled to the processor and the non-volatile memory, wherein each additional microcontroller is configured to share the non-volatile memory, and wherein each microcontroller is configured to suspend or prevent access to the non-volatile memory by other microcontrollers and the processor while it accesses the non-volatile memory.

170. The system of claim 11, further comprising:
a system interface, coupled to the processor, wherein the microcontroller is situated between the system interface and the non-volatile memory, and wherein the microcontroller is configured to intercept communications between the system interface and the non-volatile memory; and
a device interface, included in or associated with the non-volatile memory, wherein the device interface is configured to direct or restrict access to the non-volatile memory by the processor or the microcontroller.

171. The system of claim 170, wherein the microcontroller is configured to set one or more control signals to configure or redirect the device interface to grant exclusive access to the non-volatile memory to the microcontroller.

172. The system of claim 11, wherein the non-volatile memory comprises flash memory.

173. The system of claim 11, wherein to fetch program instructions or data from the non-volatile memory and load the program instructions or data into a memory of the microcontroller, the microcontroller is configured to:
fetch initialization code or data for the system.

174. The system of claim 173, wherein to fetch program instructions or data from the non-volatile memory and load the program instructions or data into a memory of the microcontroller, the microcontroller is further configured to:
fetch program instructions or data related to pre-boot security operations; and
perform the pre-boot security operations prior to boot-up of the system.

175. The system of claim 11, wherein the microcontroller is coupled to the non-volatile memory via a non-volatile memory bus, and wherein the microcontroller is operable to fetch the program instructions or data from the non-volatile memory via the non-volatile memory bus.

176. The system of claim 175, wherein the microcontroller is coupled to the processor via a host memory bus, and wherein the microcontroller is operable to switchably intercept or pass communications between the processor and the non-volatile memory.

177. The system of claim 176, wherein the host memory bus and the non-volatile memory bus are SPI (serial peripheral interface) buses.

178. The system of claim 176, wherein the microcontroller comprises or is coupled to a switch, interposed between the non-volatile memory bus and the host memory bus, wherein the switch is controllable by the microcontroller to switchably intercept or pass communications between the processor and the non-volatile memory.

179. The system of claim 178, wherein the switch comprises a Q switch or a conceptual Q switch.

180. The system of claim 178, wherein to switchably intercept or pass communications between the processor and the non-volatile memory, the microcontroller is configured to place the switch into a high-impedance state.

181. The system of claim 176, wherein the host memory and the non-volatile memory bus each comprises:
a data line;
a clock line; and
a CSb (Chip Select bar) line.

182. The system of claim 176, wherein the host memory bus and the non-volatile memory bus each comprises a plurality of lines.

183. The system of claim 182, wherein each line of the host memory bus and the non-volatile memory bus is independently switchable.

184. The system of claim 182, further comprising:
a system interface, coupled to the processor, and further coupled to the microcontroller for communicating signals between the system interface and the microcontroller;
wherein the lines of the host memory bus and the non-volatile memory bus are switchable together to suspend or inhibit communications between the system interface and the non-volatile memory.

185. The system of claim 182, wherein the lines of the host memory bus and the non-volatile memory bus are coupled to respective buffers for communicating data or signals between the non-volatile memory bus and the microcontroller.

186. The system of claim 11, further comprising:
a system interface, coupled to the processor, and further coupled to the microcontroller via a system management bus configured for communicating management signals between the system interface and the microcontroller;
wherein the microcontroller comprises a system reset line for communicating the system reset signal or other signal to or from the system interface.

187. The method of claim 17, wherein the microcontroller is included within a system-on-chip (SoC).

188. The method of claim 17, wherein the microcontroller comprises a keyboard controller for managing of controlling communications between a keyboard and the processor.

189. The method of claim 188, wherein the non-volatile memory stores keyboard controller (KBC) code.

190. The method of claim 17, wherein the program instructions or data are usable by the microcontroller for startup, general, or reset functionality.

191. The method of claim 17, wherein the program instructions or data are usable by the microcontroller for initializing the microcontroller.

192. The method of claim 17, further comprising:
during system shutdown;
configuring the non-volatile memory to allow access to the non-volatile memory only by the microcontroller before power-off;
queuing one or more writes or other exchanges with the non-volatile memory; and
completing the one or more writes or other exchanges with the non-volatile memory before final power-off.

193. The method of claim 17, further comprising:
during system shutdown;
redirecting a device interface to allow access to the non-volatile memory only by the microcontroller before power-off, wherein the device interface is coupled to the non-volatile memory and controls access to the non-volatile memory;
queuing one or more writes or other exchanges with the non-volatile memory; and
completing the one or more writes or other exchanges with the non-volatile memory before final power-off.

194. The method of claim 17, wherein the system further includes one or more additional processors, each coupled to the microcontroller and the non-volatile memory, and wherein the method further includes controlling the power or execution states of the processor and the one or more additional processors for sharing the non-volatile memory between the plurality of processors.

195. The method of claim 17, wherein the system further includes one or more additional microcontrollers, each coupled to the processor and the non-volatile memory, and wherein the method further includes each additional microcontroller sharing the non-volatile memory with the processor.

196. The method of claim 17, wherein the system further includes one or more additional microcontrollers, each coupled to the processor and the non-volatile memory, and wherein the method further includes:
each additional microcontroller sharing the non-volatile memory; and
each microcontroller suspending or preventing access to the non-volatile memory by other microcontrollers and the processor while it accesses the non-volatile memory.

197. The method of claim 17, further comprising:
intercepting communications between a system interface and the non-volatile memory, wherein the system interface is coupled to the processor, and wherein the microcontroller is situated between the system interface and the non-volatile memory; and
a device interface directing or restricting access to the non-volatile memory by the processor or the microcontroller, wherein the device interface is included in or associated with the non-volatile memory.

198. The method of claim 197, wherein the microcontroller is configured to set one or more control signals to configure or redirect the device interface to grant exclusive access to the non-volatile memory to the microcontroller.

199. The method of claim 17, wherein the non-volatile memory comprises flash memory.

200. The method of claim 17, wherein said fetching program instructions or data from the non-volatile memory further comprises fetching initialization code or data for the system.

201. The method of claim 200, further comprising:
fetching program instructions or data related to pre-boot security operations; and
performing the pre-boot security operations prior to boot-up of the system.

202. The method of claim 17, wherein fetching the program instructions or data from the non-volatile memory occurs via a non-volatile memory bus that couples the microcontroller and the non-volatile memory.

203. The method of claim 202, wherein the microcontroller is coupled to the processor via a host memory bus, and wherein the method further comprises the microcontroller switchably intercepting or passing communications between the processor and the non-volatile memory.

204. The method of claim 203, wherein the host memory bus and the non-volatile memory bus are SPI (serial peripheral interface) buses.

205. The method of claim 203, wherein the microcontroller comprises or is coupled to a switch, interposed between the non-volatile memory bus and the host memory bus, and wherein the microcontroller switchably intercepting or passing communications comprises the microcontroller controlling the switch to switchably intercept or pass communications between the processor and the non-volatile memory.

206. The method of claim 205, wherein the switch comprises a Q switch or a conceptual Q switch.

207. The method of claim 205, wherein switchably intercepting communications between the processor and the non-volatile memory comprises placing the switch into a high-impedance state.

208. The method of claim 203, wherein the host memory bus and the non-volatile memory bus each comprises:
a data line;
a clock line; and
a CSb (Chip Select bar) line.

209. The method of claim 203, wherein the host memory bus and the non-volatile memory bus each comprises a plurality of lines.

210. The method of claim 209, wherein each line of the host memory bus and the non-volatile memory bus is independently switchable.

211. The method of claim 209, further comprising:
switching the lines of the host memory bus and the non-volatile memory bus together to suspend or inhibit communications between a system interface and the non-volatile memory, wherein the system interface is coupled to the processor, and further coupled to the microcontroller for communicating signals between the system interface and the microcontroller.

212. The method of claim 209, wherein the lines of the host memory bus and the non-volatile memory bus are coupled to respective buffers for communcating data or signals between the non-volatile memory bus and the microcontroller.

213. The method of claim 17, further comprising:
communicating management signals between a system interface and the microcontroller, wherein the system interface is coupled to the processor and is further coupled to the microcontroller via a system management bus, and wherein the microcontroller comprises a system reset line for communicating the system reset signal or other signal to or from the system interface.

* * * * *